United States Patent
Thiel et al.

(10) Patent No.: US 8,836,493 B2
(45) Date of Patent: Sep. 16, 2014

(54) HAPTIC PEDAL SYSTEM

(75) Inventors: Scott Thiel, Sherwood, OR (US); Craig McConnell, Portland, OR (US)

(73) Assignee: Williams Controls, Inc., Portland, OR (US)

(*) Notice: Subject to any disclaimer, the term of this patent is extended or adjusted under 35 U.S.C. 154(b) by 268 days.

(21) Appl. No.: 13/340,482

(22) Filed: Dec. 29, 2011

(65) Prior Publication Data

US 2012/0169488 A1 Jul. 5, 2012

Related U.S. Application Data

(60) Provisional application No. 61/428,571, filed on Dec. 30, 2010, provisional application No. 61/435,905, filed on Jan. 25, 2011.

(51) Int. Cl.
| | |
|---|---|
| *B60Q 1/00* | (2006.01) |
| *B60K 26/02* | (2006.01) |
| *G05G 1/30* | (2008.04) |
| *G06F 7/00* | (2006.01) |
| *B60T 8/64* | (2006.01) |

(52) U.S. Cl.
CPC ......... *B60K 26/021* (2013.01); *B60K 2026/022* (2013.01); *B60K 2026/023* (2013.01)
USPC ............. 340/438; 340/435; 340/439; 74/512; 74/513; 74/514; 701/51; 303/152

(58) Field of Classification Search
CPC ............. G05G 1/38; G05G 5/03; G05G 1/30; B60K 26/021; B60K 26/02
USPC ................ 340/438, 435; 701/51; 74/513, 514
See application file for complete search history.

(56) References Cited

U.S. PATENT DOCUMENTS

| | | | |
|---|---|---|---|
| 2009/0030582 A1* | 1/2009 | Jacobi et al. | 701/51 |
| 2010/0037726 A1* | 2/2010 | Beck | 74/514 |
| 2012/0096976 A1* | 4/2012 | Leone et al. | 74/513 |
| 2012/0167708 A1* | 7/2012 | Brandt et al. | 74/513 |
| 2012/0279347 A1* | 11/2012 | Schmitt et al. | 74/513 |

* cited by examiner

*Primary Examiner* — Jack K Wang
(74) *Attorney, Agent, or Firm* — Schwabe, Williamson & Wyatt, P.C.

(57) ABSTRACT

An apparatus for providing haptic feedback to an operator of a vehicle is described including a pedal, torque motor, actuator and controller. The pedal is rotatable between a closed position and an open position. The torque motor applies rotational force to the pedal. The actuator is rotatably positioned between the torque motor and pedal. The controller provides haptic feedback to the operator by sending a haptic signal via the torque motor, actuator and pedal in which rotational force is applied to the pedal to rotate the pedal toward the closed position.

14 Claims, 6 Drawing Sheets

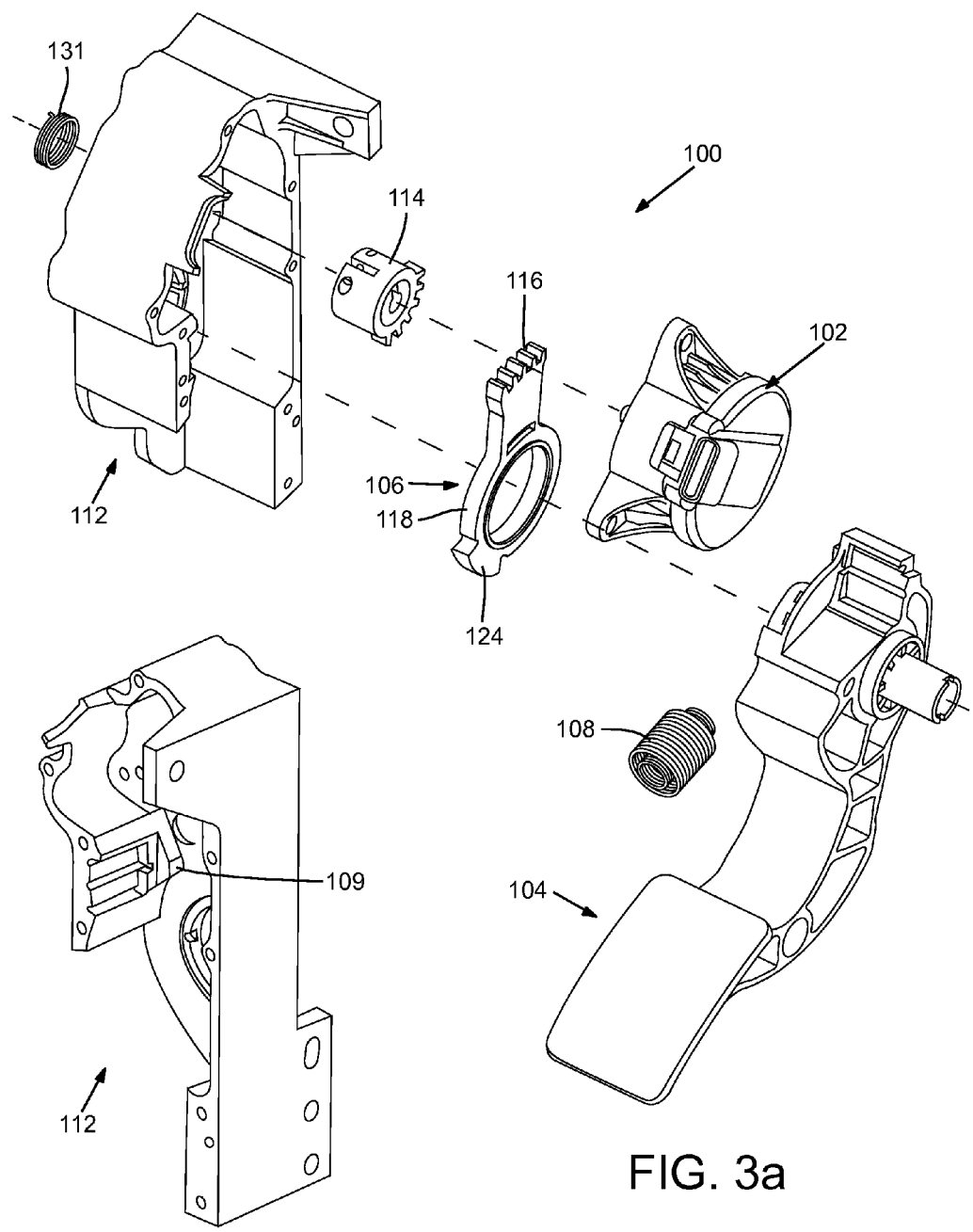
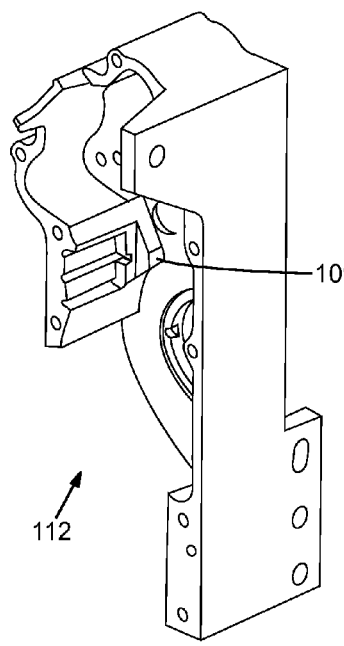
FIG. 3b
FIG. 3a

HAPTIC PEDAL SYSTEM

CROSS REFERENCE TO RELATED APPLICATION

This application claims priority under 35 U.S.C. §119(e) to U.S. Provisional Patent Application No. 61/428,571 entitled "HAPTIC PEDAL SYSTEM", filed Dec. 30, 2010, and Provisional Patent Application No. 61/435,905 entitled "HAPTIC PEDAL SYSTEM", filed Jan. 25, 2011, the disclosure of which is incorporated herein by reference.

TECHNICAL FIELD

Embodiments herein relate to the field of automotive pedals with haptic feedback.

BACKGROUND

Throttle pedals are widely used in vehicles such as automobiles, trucks, buses and commercial equipment to allow the operator to control acceleration of the vehicle. As the operator depresses the throttle pedal, the throttle system supplies more fuel to the engine, increasing engine power output to the wheel axles. Recently, a limited number of throttle pedals have been developed that provide haptic, i.e., sensory, feedback to the operator based on various conditions. However, these throttle pedals often use pulleys and cables to pull the pedal down, i.e., away from the operator's foot, and let the return springs in the pedal push the pedal back up, giving feedback to the operator. These systems can be dangerous, since the pedal is being depressed, potentially applying fuel to the engine. Electronic controls may help compensate for this danger by turning off the engine control unit (ECU) when the feedback mechanism is activated, but these electronic controls add significant complexity to the system.

SUMMARY

An apparatus for providing haptic feedback to an operator of a vehicle is described including a pedal, torque motor, actuator, and in some aspects, a controller. One aspect of the invention includes a pedal that is rotatable between a closed position and an open position. The torque motor applies a rotational force to the pedal. The actuator is rotatably positioned between the torque motor and pedal. The controller provides haptic feedback to the operator by sending a haptic signal via the torque motor, actuator and pedal in which rotational force is applied to the pedal to rotate the pedal toward the closed position.

Another aspect of the invention includes a pedal, torque motor, and actuator. The pedal is also rotatable between a closed position and an open position, but in this aspect, the pedal has a receiving portion with a cavity therein defined at least in part by a pair of cavity walls. The torque motor rotates the pedal when a signal is received from a haptic input controller. The actuator is rotatably driven by the torque motor and includes a protruding radial segment that is moveable within the cavity. When the rotation is imparted to the actuator by the torque motor beyond a predetermined distance, the radial segment butts up against one of the pair of walls defining the cavity to rotate the pedal.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 3a is an exploded view of the haptic pedal embodiment of FIG. 1.

FIG. 3b is a perspective view of the housing body from the haptic pedal embodiment of FIG. 1, rotated from the position depicted in FIG. 3a to show the stop.

DETAILED DESCRIPTION OF DISCLOSED EMBODIMENTS

Figure 1:
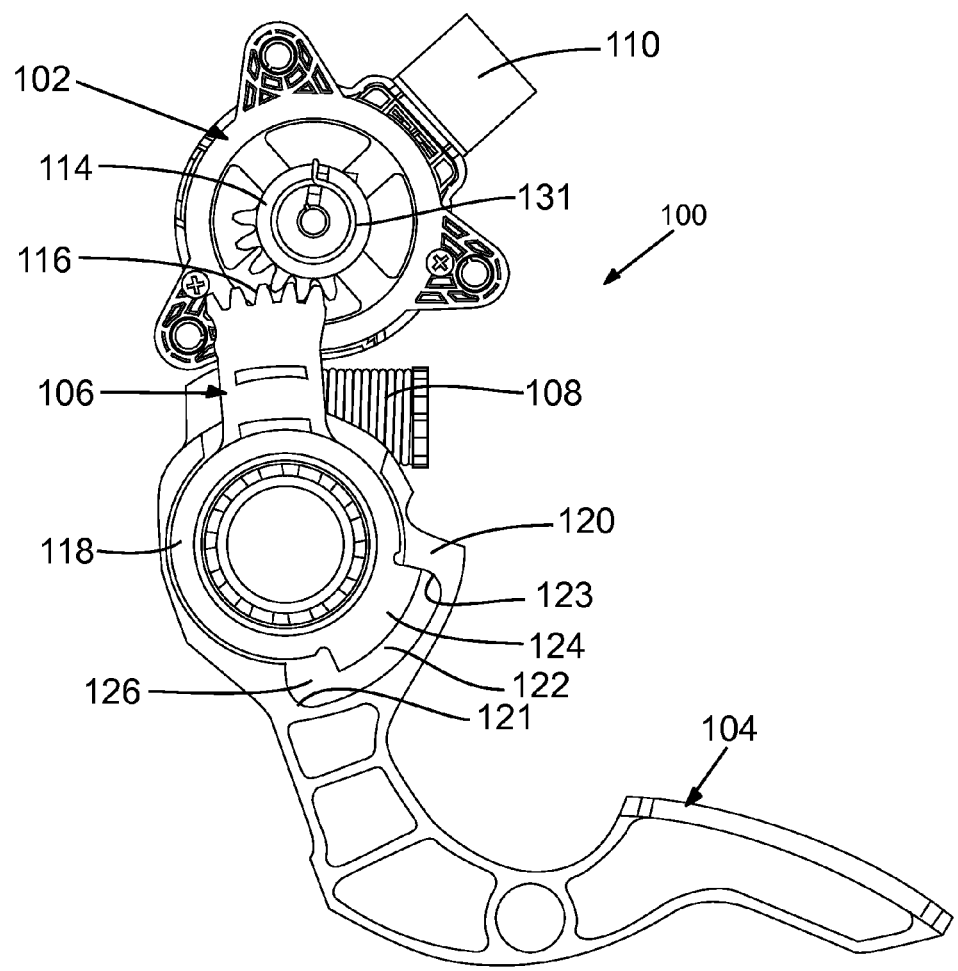
FIG. 1 is a side elevation view of a haptic pedal system in accordance with various embodiments, with the controller shown schematically.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for a haptic pedal system are provided. In exemplary embodiments, a computing device may be endowed with one or more components of the disclosed apparatuses and/or systems and may be employed to perform one or more methods as disclosed herein.

Embodiments herein provide a haptic pedal system for a vehicle, including a lever, such as a pedal, configured to provide haptic feedback to the operator of the vehicle to alert the operator to one or more specified conditions. The pedal may be configured to rotate between a closed throttle position, i.e., idle, and an open throttle position. Various embodiments of the haptic pedal system may include a motor, such as a torque motor, coupled to the pedal so that the torque motor may drive the pedal in a closed throttle direction, i.e., toward the closed throttle position. In the case of a foot petal, the closed throttle direction may be toward the operator's foot. In some embodiments the haptic pedal system may be configured so that the motor may not drive the pedal toward an open throttle position.

The haptic pedal system may be most useful when provided for the accelerator pedal, e.g., throttle, of the vehicle, although other pedal types may also use the haptic pedal system, such as the brake pedal. Similarly, while the disclosure may refer to a foot-operated pedal, it will be apparent to one skilled in the art that embodiments herein may include any lever control mechanism, such as a hand-operated lever. Additionally, while the disclosure refers to the closed throttle position and open throttle position, embodiments herein may be used with engine control systems that do not include a throttle, such as in an electric vehicle.

In various embodiments, the pedal and actuator may each rotate about an axis of rotation. The axis of rotation of the pedal may or may not be the same as the axis of rotation of the actuator. In various embodiments, the haptic pedal system may include a torque motor coupled to the pedal by an actuator. The torque motor may apply a rotational force to the actuator. Accordingly, the actuator may translate the rotational force to the pedal.

In various embodiments, the pedal may have independent rotation with respect to the actuator over a limited range. This independent rotation may provide safety and reliability of the haptic pedal system by ensuring that the pedal will return to the closed throttle position even in the event the torque motor jams. In such embodiments, the independent rotation will prevent the torque motor from applying force to the pedal toward an open throttle position.

In some embodiments, the actuator may include a gear, and the torque motor may rotate a pinion that is operatively coupled to the gear so that the actuator rotates as the pinion rotates. The actuator and pedal may include interacting features to allow the actuator to rotate the pedal. Accordingly, the actuator may include an engaging portion configured to engage a receiving portion of the pedal. For example, the receiving portion of the pedal may include a cavity, and the engaging portion of the actuator may include one or more radial segments that extend radially, i.e., outward from the axis of rotation of the actuator, into the cavity. The radial segments of the actuator may each have a leading surface configured to engage the receiving portion of the pedal. When the actuator is in an engaged position, the leading surface of the radial segments may interact with the receiving portion of the pedal, and the rotation of the actuator may rotate the pedal.

In various embodiments, the cavity of the pedal may have an angular length that is longer than an angular length of the radial segment on the actuator, leaving a gap in the cavity. The gap may allow the pedal to rotate with respect to the actuator. The gap may have a gap length that is sized to allow the pedal to return to the closed throttle position even if the torque motor becomes jammed when the pedal is in the open throttle position.

In various embodiments, the haptic pedal system may include a motor-biasing element to return the torque motor to a starting position when the torque motor is not active. For example, the torque motor may include an internal return spring, and/or the system may include one or more springs, that return the torque motor to the starting position. The motor-biasing element may prevent gear lash between the pinion and the gear of the actuator and/or prevent lash between the pedal and the actuator.

Similarly, the pedal may include a pedal-biasing element, such as one or more springs, to return the pedal to the closed throttle position when the operator is not applying force to the pedal. Such a pedal-biasing element would ensure that the throttle is not biased toward an open position when the operator is not applying force to the pedal. Additionally, the pedal-biasing element may prevent the torque motor from applying force to the pedal toward the open throttle position.

In various embodiments, the haptic pedal system may include a stop mechanism that prevents the torque motor from applying force to the pedal in the closed throttle direction past the closed throttle position. For example, the haptic pedal system may include a mechanical stop that prevents the actuator from rotating further when the pedal reaches the closed throttle position.

In various embodiments, the haptic pedal system may include a controller, such as an electronic controller, for controlling the torque motor. The controller may receive instructions from a master control system. The master control system may monitor for and/or measure certain conditions, and may send instructions to the controller to activate the torque motor, thereby providing feedback to the operator, in response to those conditions. The master control system may provide feedback to the operator in response to any suitable conditions, such as alerting the operator (1) to the proximity of other automobiles or obstructions, (2) to the vehicle drifting from the vehicle's lane, (3) to the operator's eyes being closed for more than a momentary blink, or (4) to other operating conditions that could cause reason for concern. The master control system may also provide guidance as to when the operator should shift gears, or it may provide topographical information on the road. Any number of other conditions may also cause the master control system to alert the driver. The master control system may use any suitable protocol for communicating with the controller and/or other systems of the vehicle, such as the controller area network (CAN) bus system.

In various embodiments, a gear ratio between the pinion and the actuator may be selected to provide sufficient power to the pedal to effectively alert the operator. For example, a force of about 15 N has been found to be effective for the operator to feel the feedback, although other amounts of force may be used, such as a force of about 5 N to about 30 N. The torque motor may generally provide greater torque, and therefore more force to the pedal, as more electrical current is provided to the torque motor. However, a number of considerations must be balanced to determine optimal operation of the torque motor. For example, torque motors typically have a range of effective rotation, such as about 70-80 degrees, and within the range of effective rotation there is a linear range of rotation in which the torque motor delivers a more linear, e.g., constant, torque. Therefore, for effective operation of the haptic pedal system, it may be desirable to maintain the torque motor within the linear range. The magnitude of the linear range generally decreases as the electrical current provided to the torque motor is increased. Furthermore, the gear ratio may decrease the corresponding amount of effective pedal rotation that results from the rotation of the torque motor within the linear range. The torque motor may also consume more power and produce more heat at higher current levels. As such, the gear ratio and amount of current supplied to operate the torque motor may be chosen to balance these considerations while still applying the desired force to the pedal. Additionally, the torque motor may have "detent" forces at 90 degree increments, which would produce an undesirable feel to the pedal operation when the haptic system is not active. This could also require additional strength needed in the motor biasing element to overcome and ensure that there is no gear lash in the assembly when the torque direction changes or the assembly transitions from zero load to loaded.

In various embodiments, the haptic pedal system may be configured to provide feedback to the operator in accordance with one or more force profiles. For example, the torque motor may apply a constant load to the pedal for a given period of time (e.g., a 15 N load for 5 seconds), may vibrate the pedal (e.g., a 10 N load at 10 Hz for 2-5 seconds), may apply a load that alternates between on and off for a given period of time (e.g., a repeating 10 N load for 0.5 seconds on and 0.5 seconds off), and/or may use any combination of these or other protocols. The torque motor may be configured to move the pedal a specific number of degrees. It may also be configured to utilize different force profiles depending upon the condition to which the driver is being alerted. For example, the master control system may send instructions to the controller to apply a single force to alert the driver to shift gears, and/or may send instructions to apply a vibrating force to alert the driver to an obstacle in the path of the vehicle.

Figure 2:
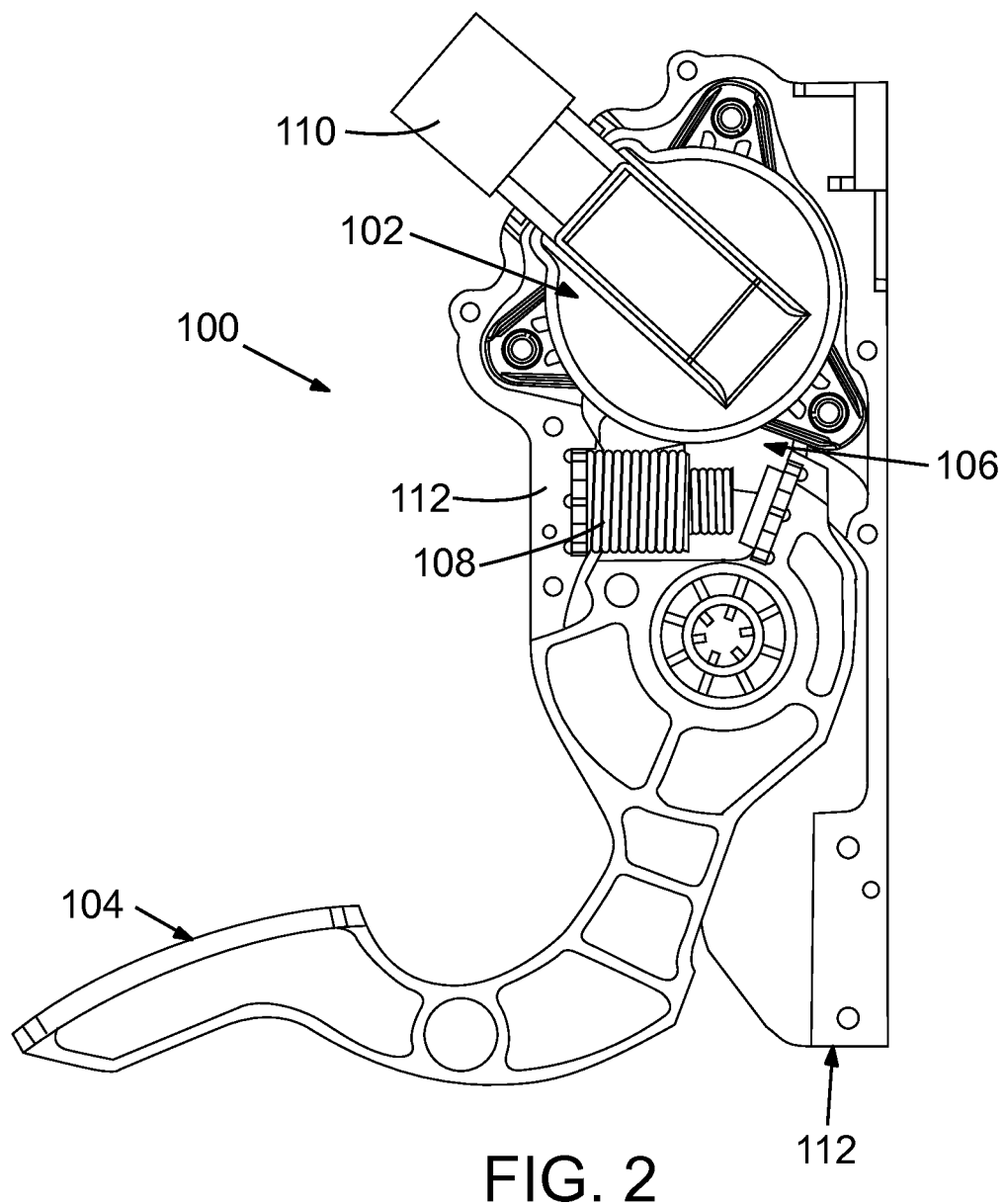
FIG. 2 is a side elevation view of the haptic pedal embodiment of FIG. 1, from the opposite side, with the controller shown schematically.
Figure 4:
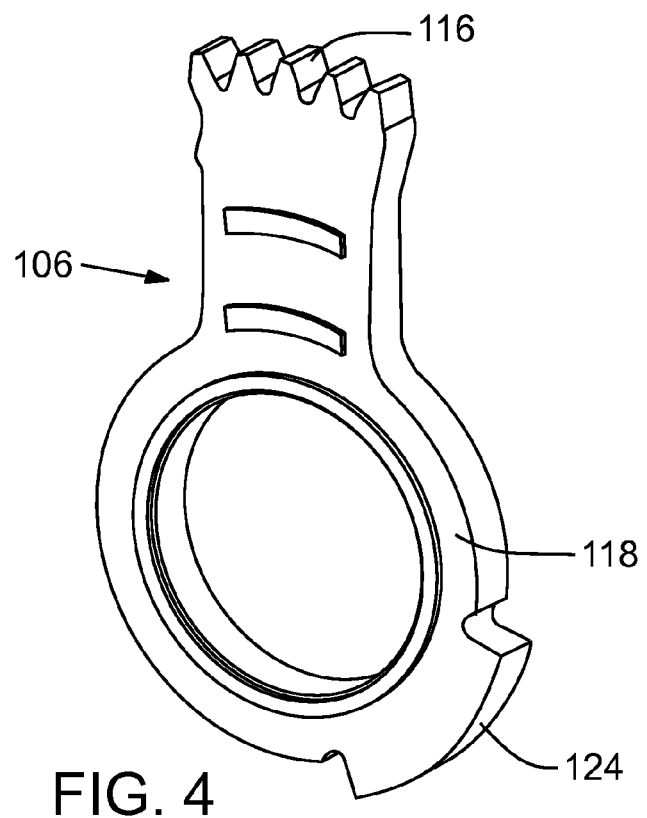
FIG. 4 is an enlarged perspective view of the actuator from the haptic pedal embodiment of FIG. 1.
Figure 5:
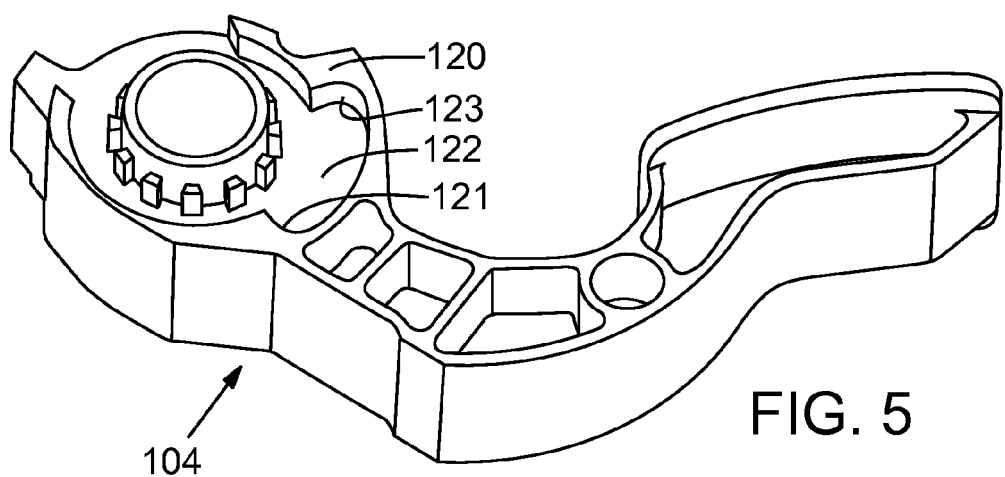
FIG. 5 is an enlarged perspective view of the pedal from the haptic pedal embodiment of FIG. 1.

Referring to FIGS. 1-3, an embodiment of the haptic pedal system 100 includes a torque motor 102 coupled to a pedal 104 by an actuator 106. A better view of actuator 106 and pedal 104 are shown in FIGS. 4 and 5, respectively. Referring again to FIGS. 1-3, the haptic pedal system 100 further includes a spring pack 108, a stop 109 (shown only in FIG. 3b), and an internal return spring 131. The operation of the torque motor is controlled by a controller 110 (shown schematically in FIGS. 1-2 and 6-8) coupled to the torque motor 102. Controller 110 may receive operating instructions from a master control system, which may be integrated in controller 110 or the vehicle's ECU, VMCU, or ECM. Torque motor 102, pedal 104, actuator 106, spring pack 108, stop 109, and internal return spring 131 are all housed in a body 112. A pinion 114 is mounted to torque motor 102 so that the torque motor may rotate the pinion. Pinion 114 may interface with a gear 116 of actuator 106. Pinion 114 may have any suitable gear ratio with gear 116. In the embodiment shown in FIGS. 1-3, the gear ratio is substantially equal to 3.5:1.

Actuator 106 includes an engaging portion 118 that interacts with a receiving portion 120 of pedal 104. A cavity 122 is defined in receiving portion 120 of pedal 104. Each end of cavity 122 is further defined at least in part by a pair of cavity walls 121 and 123. Engaging portion 118 of actuator 106 includes a radial segment 124 that extends into cavity 122 of receiving portion 120 and is moveable therein. The angular length of radial segment 124 is typically less than the angular length of the cavity 122 of receiving portion 120, leaving a gap 126. The arrangement is such that when rotation is imparted to actuator 106 by torque motor 102 beyond a predetermined distance, radial segment 124 butts up against one of the pair of walls 121 or 123 to rotate pedal 104.

Figures 6, 7:
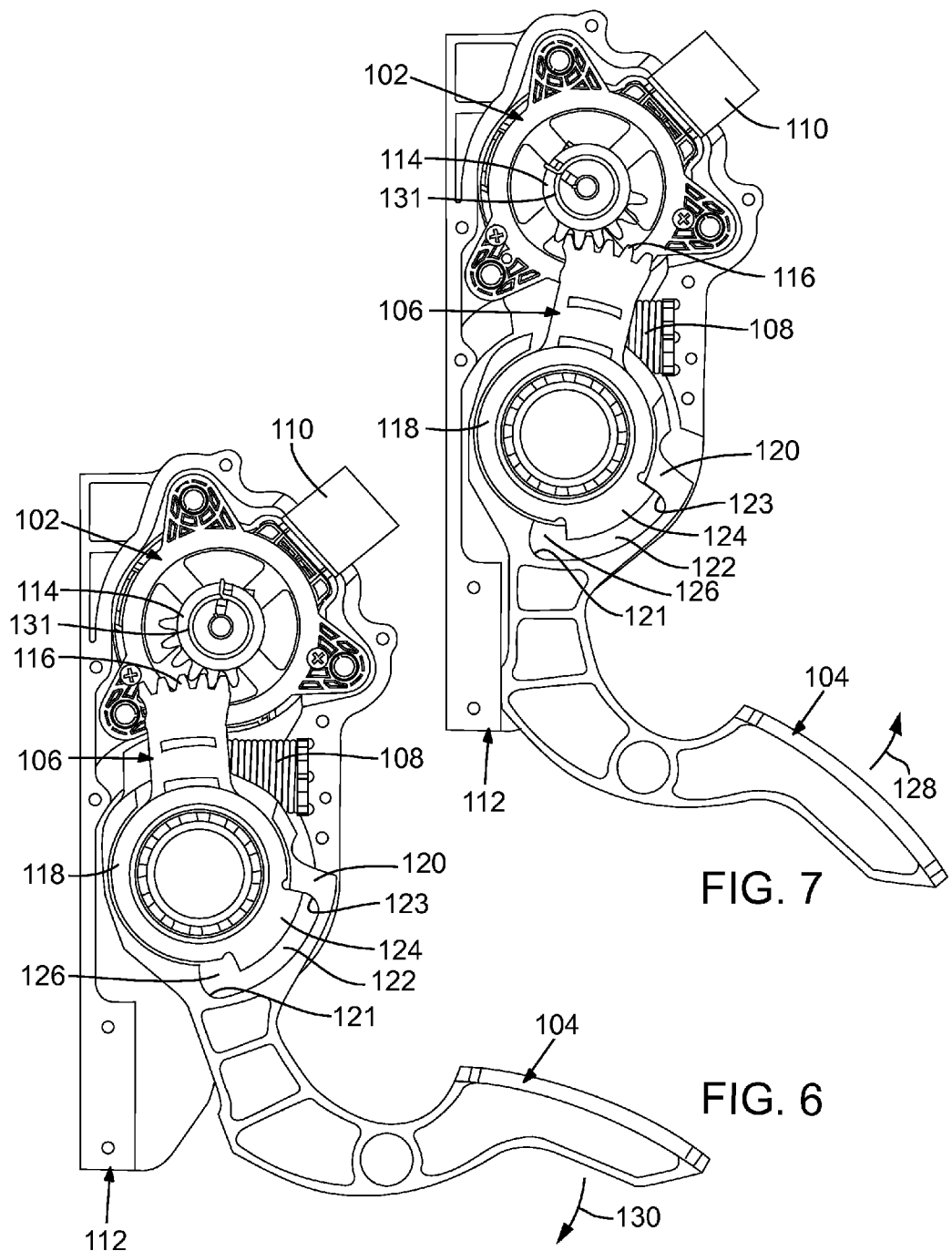
FIG. 6 illustrates the haptic pedal embodiment of FIG. 1 in the closed position under normal operating conditions.
FIG. 7 illustrates the haptic pedal embodiment of FIG. 1 in the open position under normal operating conditions.

As depicted in FIGS. 6 and 7, pedal 104 is configured to rotate from a closed throttle position shown in FIG. 6 to an open throttle position shown in FIG. 7. Accordingly, pedal 104 may travel in a closed throttle direction 128, toward the closed throttle position (see FIG. 7), and in an open throttle direction 130, opposite the closed throttle direction and toward the open throttle position (see FIG. 6). When the torque motor 102 is activated, radial segment 124 is operatively coupled to receiving portion 120, and torque motor 102 applies a rotational force to pedal 104 in the closed throttle direction 128. Torque motor 102 is prevented from pushing pedal 104 past the closed throttle position by stop 109 (shown in FIG. 3b), which restricts movement of the actuator 106. Torque motor 102 includes an internal return spring 131 that returns the torque motor 102 to a starting position when not activated. Similarly, spring pack 108 biases pedal 104 in the closed throttle direction so that pedal 104 returns to the closed throttle position when no force is exerted on pedal 104 by the operator. Spring pack 108 also helps prevent torque motor 102 from moving pedal 104 in the open throttle direction 130.

Figure 8:
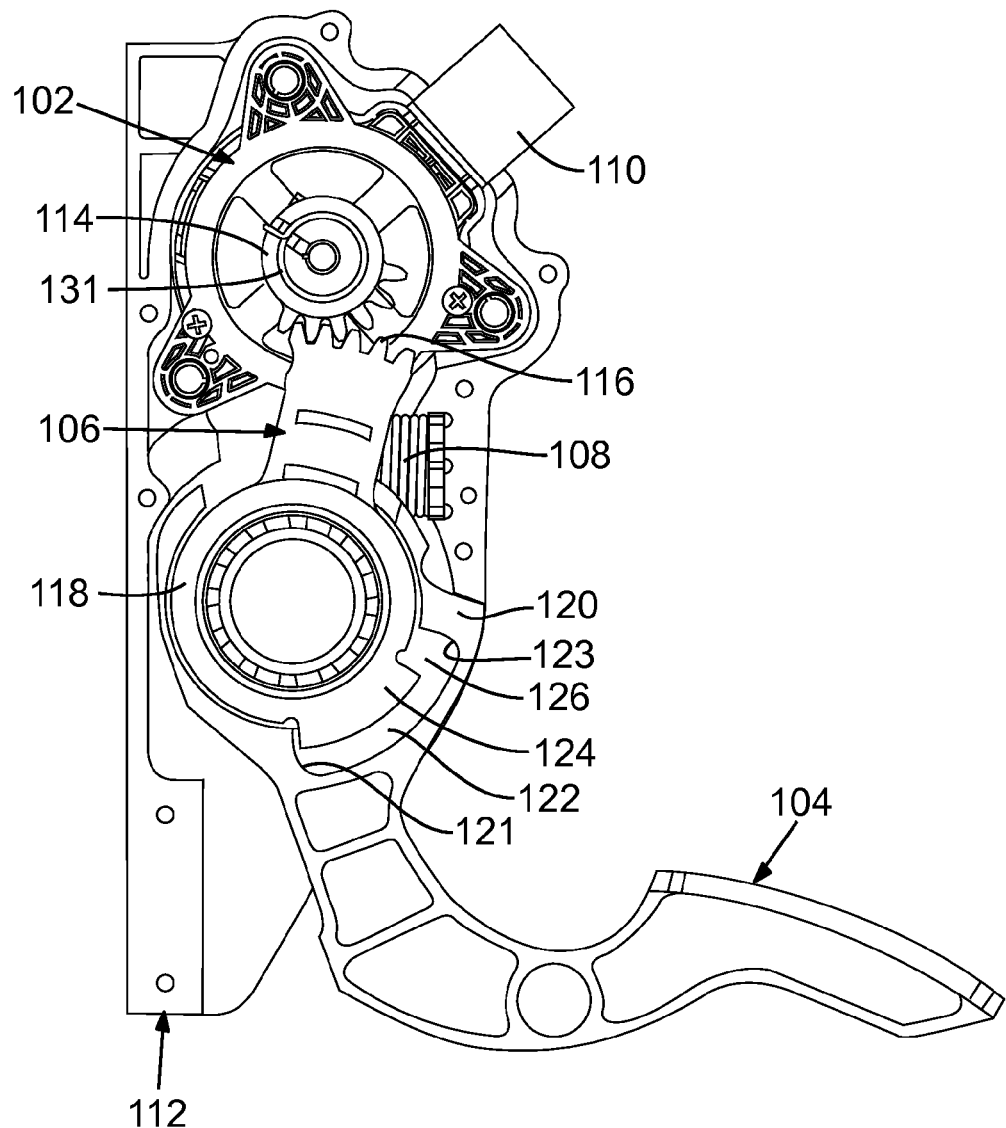
FIG. 8 illustrates the haptic pedal embodiment of FIG. 1 in the closed position in the event the torque motor jams and/or the actuator locks in place.

Gap 126 in receiving portion 120 of pedal 104 allows the pedal to move independently of actuator 106. Gap 126 may have an angular length sized to allow pedal 104 to return to the closed throttle position in the event that torque motor 102 jams and/or actuator 106 is locked in place. Accordingly, in some embodiments, the angular length of gap 126 may be equal to or greater than the angular distance from the closed throttle position to the open throttle position. Such an angular length of gap 126 would allow the pedal 104 to return to the closed throttle position even in the event the torque motor 102 jams when the pedal is in the open throttle position, as depicted in FIG. 8.

Should the torque motor 102 become jammed when the pedal 104 is in the closed throttle position, the pedal may not be able to move along its angular path. However, the closed throttle position is a safe condition, since no fuel is being applied to the engine.

Additionally, the torque motor 102 may be prevented from applying a force to pedal 104 in the open throttle direction 130 because of gap 126 in the receiving portion 120 of the pedal. Should torque motor 102 rotate actuator 106 in the open throttle direction 130, the actuator will move independently of pedal 104.

Accordingly, haptic pedal system 100 may provide force feedback to the operator in the closed throttle direction, while eliminating the possibility that torque motor 102 may apply force to pedal 104 in the open throttle position. Controller 110 may receive and/or generate instructions to activate an alert to the operator based on one or more force profiles, as described above, such as applying a constant load to the pedal for a given period of time, applying a vibrating load to the pedal, applying a load that alternates between on and off for a given period of time, and/or a combination of these protocols.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus for providing haptic feedback to an operator of a vehicle, comprising:
   a pedal that is rotatable between a closed position and an open position, the pedal having a receiving portion with a cavity;
   a torque motor for applying rotational force to the pedal;
   an actuator rotatably positioned between the torque motor and pedal, the actuator including a radial segment disposed in the cavity of the pedal, and the radial segment being movable by the torque motor; and
   a controller for providing haptic feedback by sending a haptic signal to the operator via the torque motor, actuator and pedal in which rotational force is applied to the pedal via the radial segment of the actuator to rotate the pedal toward the closed position,
   wherein the cavity of the pedal includes a gap created by the relative angular lengths of the cavity and the radial segment, the gap allowing the pedal to rotate independently of the actuator.

2. The apparatus for providing haptic feedback to an operator of claim 1, wherein the pedal is able to rotate toward the closed position in the event the controller, torque motor, or actuator malfunctions.

3. The apparatus for providing haptic feedback to an operator of claim 1 further comprising a biasing member that biases the actuator and pedal toward the closed position.

4. The apparatus for providing haptic feedback to an operator of claim 1 further comprising a stop for preventing the torque motor from applying force to the pedal passed the closed position.

5. The apparatus for providing haptic feedback to an operator of claim 1, wherein the torque motor includes an internal biasing member that returns the torque motor to a starting position.

6. The apparatus of claim 1, further comprising a haptic input controller to selectively provide a signal to the torque motor.

7. An apparatus for providing haptic feedback to an operator of a vehicle, comprising:
   a pedal that is rotatable between a closed position and an open position, the pedal having a receiving portion with a cavity therein defined at least in part by a pair of cavity walls;
   a torque motor for rotating the pedal when a signal is received from a haptic input controller and;
   an actuator that is rotatably driven by the torque motor, the actuator including a protruding radial segment that is moveable within the cavity, such that when rotation is imparted to the actuator by the torque motor beyond a predetermined distance, the radial segment butts up against one of the pair of walls defining the cavity to rotate the pedal,
   wherein the cavity of the pedal includes a gap created by the relative angular lengths of the cavity and the radial segment, the gap allowing the pedal to rotate independently of the actuator.

8. The apparatus for providing haptic feedback to an operator of claim 7, wherein the pedal is able to rotate toward the closed position in the event the controller, torque motor, or actuator malfunctions.

9. The apparatus for providing haptic feedback to an operator of claim 7 further comprising a biasing member that biases the actuator and pedal toward the closed position.

10. The apparatus for providing haptic feedback to an operator of claim 7 further comprising a stop for preventing the torque motor from applying force to the pedal passed the closed position.

11. The apparatus for providing haptic feedback to an operator of claim 7, wherein the torque motor includes an internal biasing member that returns the torque motor to a starting position.

12. The apparatus for providing haptic feedback to an operator of claim 7, wherein the pedal is permitted to rotate independently of the actuator shaft, torque motor, or controller.

13. The apparatus of claim 7, further comprising a haptic input controller to selectively provide a signal to the torque motor.

14. An apparatus for providing haptic feedback to an operator of a vehicle, comprising:
   a pedal that is rotatable between a closed position and an open position, the pedal having a distal end, a proximal end, and a receiving portion extending from the distal end to the proximal end, the receiving portion including a cavity extending further toward the proximal end;
   a torque motor for applying rotational force to the pedal and having a pinion mounted thereon;
   an actuator rotatably positioned between the torque motor and the pedal, having a first end proximate the torque motor, a second end proximate the pedal, a gear extending from the first end, and an engagement portion extending from the second end, the gear being operatively coupled to the pinion, and the engagement portion being operatively coupled to the receiving portion and including a protruding radial segment rotatable within the cavity; and
   a controller for providing haptic feedback to the operator by sending a haptic signal to the operator via the torque motor, which causes the pinion to apply a rotational force to the gear, the radial segment to interact with the receiving portion, and the pedal to rotate toward the closed position.

* * * * *